(12) United States Patent
Ju et al.

(10) Patent No.: US 9,705,217 B2
(45) Date of Patent: Jul. 11, 2017

(54) ELECTRICAL CONNECTOR

(71) Applicant: LOTES CO., LTD, Keelung (TW)

(72) Inventors: Ted Ju, Keelung (TW); Wen Wei Lin, Keelung (TW); Li Ming Zhang, Keelung (TW); Han Qing Guo, Keelung (TW)

(73) Assignee: LOTES CO., LTD, Keelung (TW)

( * ) Notice: Subject to any disclaimer, the term of this patent is extended or adjusted under 35 U.S.C. 154(b) by 0 days.

(21) Appl. No.: 14/606,718

(22) Filed: Jan. 27, 2015

(65) Prior Publication Data
US 2016/0020560 A1    Jan. 21, 2016

Related U.S. Application Data

(60) Provisional application No. 62/024,728, filed on Jul. 15, 2014.

(51) Int. Cl.
| | |
|---|---|
| *H01R 13/648* | (2006.01) |
| *H01R 12/71* | (2011.01) |
| *H01R 24/78* | (2011.01) |
| *H01R 24/00* | (2011.01) |
| *H01R 12/50* | (2011.01) |
| *H01R 12/70* | (2011.01) |
| *H01R 13/6594* | (2011.01) |
| *H01R 13/6585* | (2011.01) |
| *H01R 24/60* | (2011.01) |

(Continued)

(52) U.S. Cl.
CPC ........... *H01R 12/712* (2013.01); *B29C 63/00* (2013.01); *H01R 12/707* (2013.01); *H01R 13/6477* (2013.01); *H01R 13/6585* (2013.01); *H01R 13/6594* (2013.01); *H01R 23/02* (2013.01); *H01R 23/7073* (2013.01); *H01R 24/60* (2013.01); *H01R 24/78* (2013.01); *H01R 43/18* (2013.01); *H01R 2107/00* (2013.01)

(58) Field of Classification Search
CPC ........................ H01R 23/668; H01R 13/6585
USPC ................................ 439/607.1, 607.4, 660
See application file for complete search history.

(56) References Cited

U.S. PATENT DOCUMENTS

| 4,073,130 A * | 2/1978 | Jauch ..................... G04C 21/08 368/269 |
| 6,764,339 B2 * | 7/2004 | Kubo ................. H01R 23/6873 439/607.24 |

(Continued)

*Primary Examiner* — Phuong Dinh
(74) *Attorney, Agent, or Firm* — Locke Lord LLP; Tim Tingkang Xia, Esq.

(57) ABSTRACT

An electrical connector includes a body having a tongue, a pair of first differential signal terminals and a pair of second differential signal terminals fixed to the body, and a middle shielding sheet fixed to the tongue, and located between the first and second differential signal terminals. The tongue includes an upper surface having two depressed first receiving slots and a lower surface having two depressed second receiving slots. A first groove is depressed from each first receiving slot. A second groove is upward depressed from each second receiving slot. Each first differential signal terminal has a first contact portion fixed to and exposed from the upper surface of the tongue. Each second differential signal terminal has a second contact portion fixed to and exposed from the lower surface of the tongue. The first and second contact portions are partially accommodated in the first and second receiving slot respectively.

22 Claims, 7 Drawing Sheets

(51) Int. Cl.
*B29C 63/00* (2006.01)
*H01R 43/18* (2006.01)
*H01R 13/6477* (2011.01)
*H01R 107/00* (2006.01)

(56) References Cited

U.S. PATENT DOCUMENTS

| | | | | |
|---|---|---|---|---|
| 7,645,146 B2* | 1/2010 | Lindkamp | ............ | H01R 12/721 |
| | | | | 439/79 |
| 8,851,927 B2* | 10/2014 | Hsu | .................... | H01R 13/6594 |
| | | | | 439/607.11 |
| 9,209,573 B1* | 12/2015 | Chen | .................. | H01R 13/6581 |

* cited by examiner

ELECTRICAL CONNECTOR

CROSS-REFERENCE TO RELATED APPLICATION

This application claims priority to and the benefit of, pursuant to 35 U.S.C. §119(e), U.S. provisional patent application Ser. No. 62/024,728, filed Jul. 15, 2014, entitled "ELECTRICAL CONNECTOR," by Ted Ju, which is incorporated herein in its entirety by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

FIELD OF THE INVENTION

The present invention relates to an electrical connector, and particularly to an input/output connector for transmitting a high-speed signal.

BACKGROUND OF THE INVENTION

Serving as a standard input/output interface, a universal serial bus (USB) interface has been widely applied to various electronic devices. As the USB transmission rate is gradually improved, differential signal terminal pairs are correspondingly used in a USB connector to transmit a high frequency signal. Currently, a USB connector generally includes a body made of plastic and two rows of terminals disposed in the body. The body includes a base and a tongue extending forward from the base. The two rows of terminals are respectively disposed on upper and lower surfaces of the tongue, and each row of terminals includes a differential signal terminal pair. The upper and lower rows of terminals are separated by the body, and a plastic material is filled between the two rows of terminals. In this type of structure, the differential signal terminal pair is surrounded by a lot of plastic, the attenuation action of plastic on the high frequency signal is great, and a small part of differential signal terminals are exposed to air, so that the insertion loss, the return loss and the crosstalk of the high frequency signal in a transmission process are affected, which is adverse to transmission of the high frequency signal.

Therefore, a heretofore unaddressed need exists in the art to address the aforementioned deficiencies and inadequacies.

SUMMARY OF THE INVENTION

In one aspect, the present invention is directed to an electrical connector, where differential signal terminals of the electrical connector are exposed to air to a great extent, so as to effectively improve the high frequency performance thereof.

In one embodiment, an electrical connector includes a body, a pair of first differential signal terminals and a pair of second differential signal terminals fixed to the body, and a middle shielding sheet. The body includes a tongue extending along a direction from front to rear. The tongue has an upper surface and a lower surface opposite to each other. Two first receiving slots are depressed from the upper surface of the tongue, and a first groove is further downward depressed from each of the first receiving slots. Two second receiving slots are depressed from the lower surface of the tongue, and a second groove is further upward depressed from each of the second receiving slots. Each of the first differential signal terminals has a first contact portion fixed to and exposed from the upper surface of the tongue, and the first contact portion is partially accommodated in the first receiving slot. Each of the second differential signal terminals has a second contact portion fixed to and exposed from the lower surface of the tongue, and the second contact portion is partially accommodated in the second receiving slot. The middle shielding sheet is fixedly disposed at the tongue, and located between the first differential signal terminals and the second differential signal terminals.

In one embodiment, the first receiving slot has a bottom wall supporting the first contact portion. The first contact portion has a first contact location used for contacting a mating element, and the bottom wall is located right below the first contact location. The second receiving slot has a top wall supporting the second contact portion. The second contact portion has a second contact location used for contacting a mating element, and the top wall is located right above the second contact location. The tongue has a direction from left to right perpendicular to the direction from front to rear and a direction from top to bottom. The width of the first receiving slot in the direction from left to right is greater than the width of the first groove, and the width of the second receiving slot in the direction from left to right is greater than the width of the second groove.

In one embodiment, the middle shielding sheet is provided with a hollow portion corresponding to locations of the first groove and the second groove, and the first groove is in communication with the second groove. Both the middle shielding sheet and the first differential signal terminals are insert-molded in the tongue, and the second differential signal terminals are assembled to the lower surface. The first contact portion is at least partially exposed to the first groove, and the second contact portion is at least partially exposed to the second groove.

In one embodiment, a depressed slot located between two first differential signal terminals is further depressed from the upper surface, and the depressed slot is in communication with two adjacent first receiving slots. Multiple non-high-speed terminals are further insert-molded in the upper surface of the tongue. The non-high-speed terminals and the pair of first differential signal terminals are arranged into a row. Multiple first receiving slots correspondingly accommodating the non-high-speed terminals are additionally depressed from the upper surface. Multiple positioning slots are further depressed from the upper surface. The positioning slots are located between two adjacent non-high-speed terminals and between a non-high-speed terminal and a first differential signal terminal adjacent to each other, and the positioning slots are in communication with two adjacent first receiving slots. The length of at least one positioning slot along the direction from front to rear is less than the length of the depressed slot along the direction from front to rear.

In another aspect, the present invention is directed to an electrical connector. In one embodiment, the electrical connector includes: a body, two pairs of first differential signal terminals and two pairs of second differential signal terminals fixed to the body, a pair of third signal terminals disposed between each of the two pairs of first differential signal terminals and each of the two pairs of second differential signal terminals, and a grounding terminal. The body includes a tongue extending along a direction from front to rear. The tongue has an upper surface and a lower surface opposite to each other. Four first receiving slots are depressed from the upper surface, and a first groove is further downward depressed from each of the first receiving slots. Four second receiving slots are depressed from the lower surface, and a second groove is further upward depressed from each of the second receiving slots. Each of the first differential signal terminals has a first contact portion fixed to and exposed from the upper surface of the tongue, and the first contact portion is partially accommodated in the first receiving slot. Each of the second differential signal terminals has a second contact portion fixed to and exposed from the lower surface of the tongue, and the second contact portion is partially accommodated in the second receiving slot. The third signal terminals are non-high-speed terminals. The grounding terminal is disposed at an outer side of each of the two pairs of first differential signal terminals and the two pairs of second differential signal terminals away from the third signal terminals.

In one embodiment, the electrical connector further includes a middle shielding sheet fixedly disposed at the tongue, and located between the first differential signal terminals and the second differential signal terminals. The middle shielding sheet is provided with a hollow portion corresponding to locations of the first groove and the second groove, and the first groove is in communication with the second groove. Both the middle shielding sheet and the first differential signal terminals are insert-molded in the tongue, and the second differential signal terminals are assembled to the lower surface. The middle shielding sheet protrudes from a front edge and left and right side edges of the tongue.

In one embodiment, the electrical connector is further provided with multiple power supply terminals and multiple reserved terminals. All of the foregoing terminals are arranged into two rows separately located on the upper surface and the lower surface. Each row of terminals are sequentially provided in a direction from left to right with: one of the grounding terminals, one of the pairs of first differential signal terminals, one of the power supply terminals, one of the reserved terminals, one of the pairs of third signal terminals, one of the reserved terminals, one of the power supply terminals, one of the pairs of first differential signal terminals, and one of the grounding terminals. A row of terminals located on the upper surface and a row of terminals located on the lower surface are centrosymmetrically arranged.

In one embodiment, an upper shielding sheet and a lower shielding sheet are respectively disposed above and below the tongue, and are buckled and connected to each other.

In a further aspect, the present invention is directed to an electrical connector. In one embodiment, the electrical connector includes a body, at least one pair of differential signal terminals fixed to the body, and a metal casing covering the body. At least two grooves are disposed in the body, and the grooves are filled with air. Each of the first differential signal terminals has a contact portion used for electrically connecting to a mating element. Each of the contact portions is correspondingly located above a groove. The contact portion is in communication with the groove and exposed to air in the groove.

In one embodiment, the electrical connector further includes a middle shielding sheet fixedly disposed at the body, and located below the differential signal terminal. Locations on the middle shielding sheet corresponding to the grooves are provided with a hollow portion. An upper shielding sheet and a lower shielding sheet are respectively disposed above and below the body, and are buckled and connected to each other. The upper shielding sheet and the lower shielding sheet respectively contact the metal casing.

Compared with the related art, in certain embodiments of the present invention, a first groove is disposed below a tongue corresponding to a first contact portion, a second groove is disposed above the tongue corresponding to a second contact portion, and plastic materials around a first differential signal terminal and a second differential signal terminal are reduced, so that the first differential signal terminal and the second differential signal terminal are exposed to air as much as possible, thereby effectively reducing the insertion loss and the return loss of a high frequency signal during transmission in these terminals. Meanwhile, a middle shielding sheet disposed in the middle of the tongue facilitates alleviation of the problem of crosstalk between upper and lower pairs of differential signal terminals.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
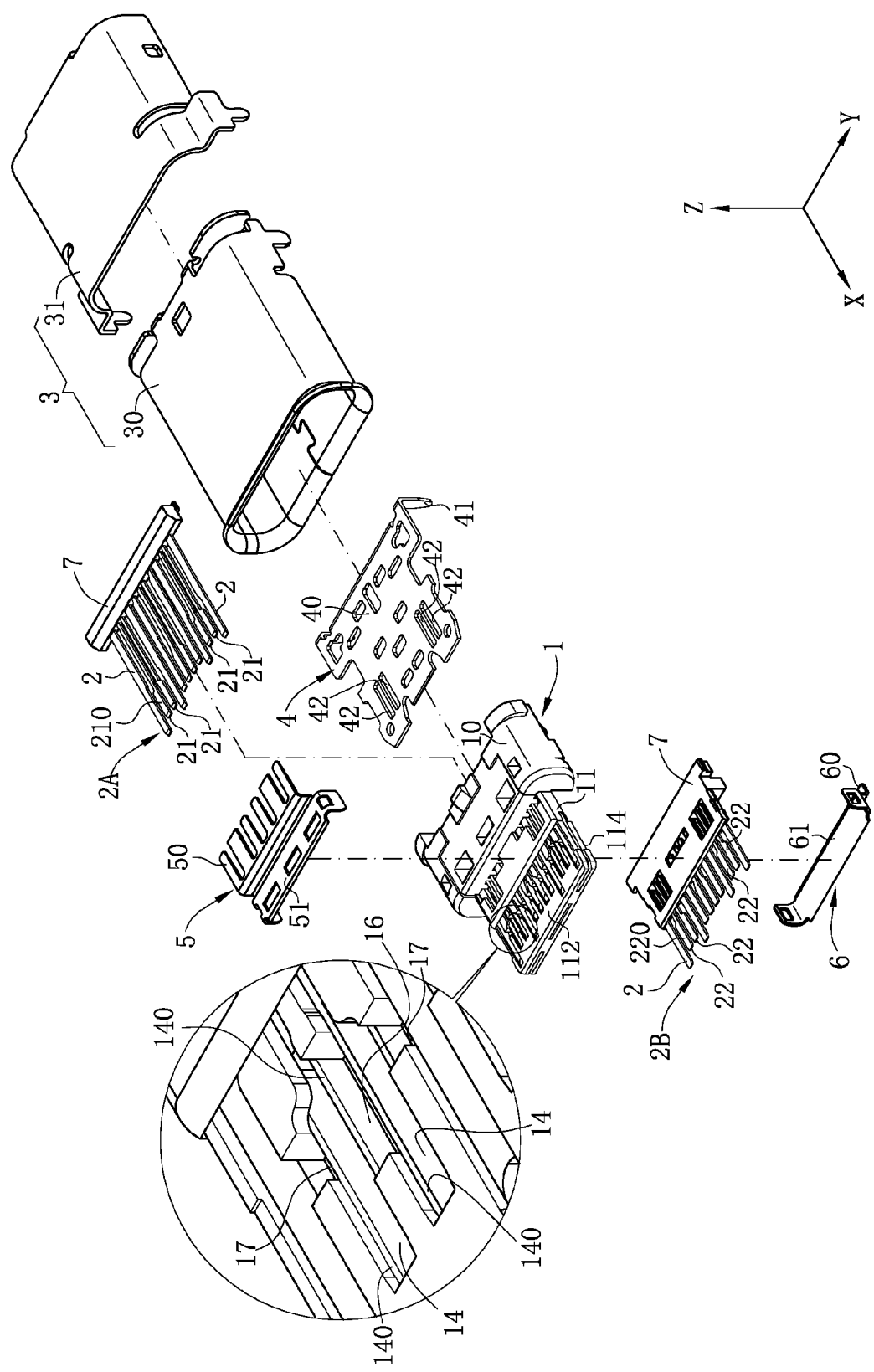
FIG. 1 is a schematic exploded view and a partial enlarged view of an electrical connector according to one embodiment of the present invention.
Figure 2:
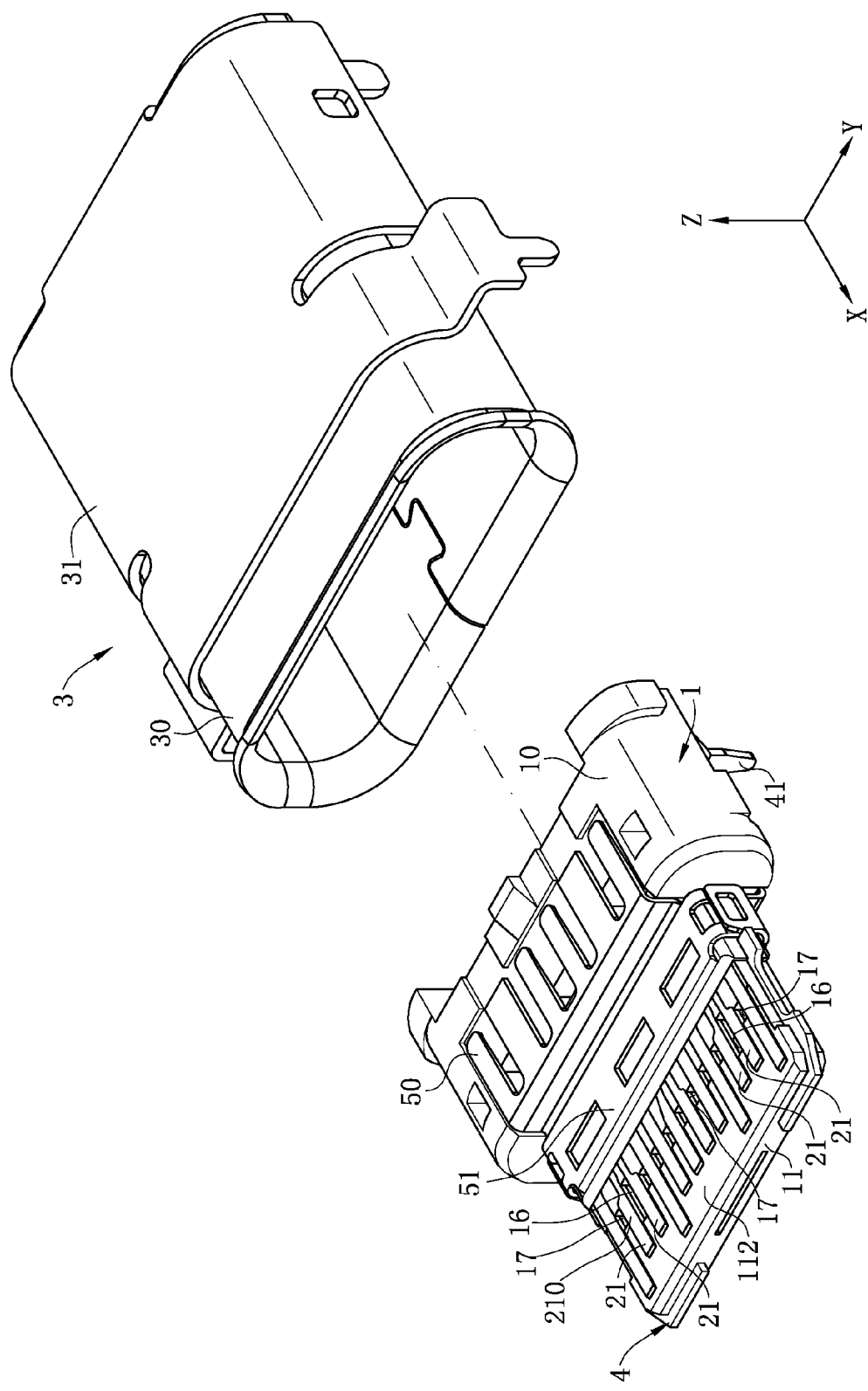
FIG. 2 is a schematic view obtained after upper and lower rows of terminals are fixed to a body, and upper and lower shielding sheets are fixed to the body in FIG. 1.
Figure 3:
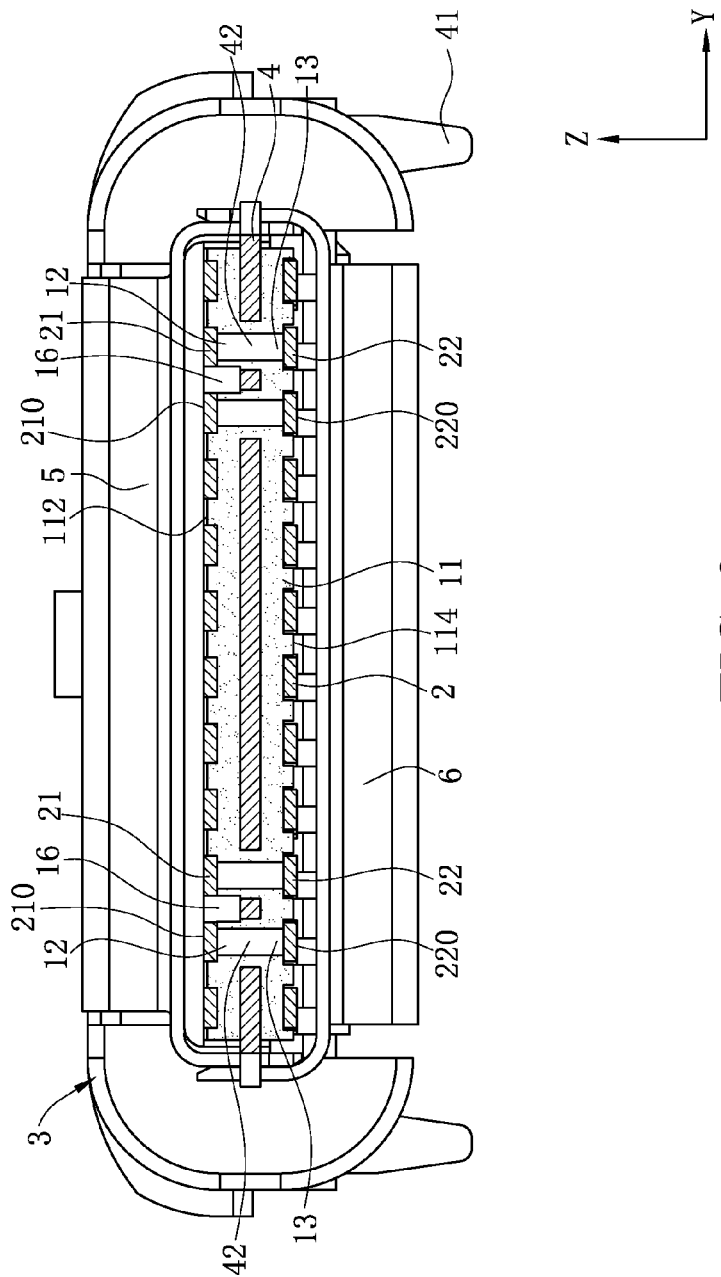
FIG. 3 is a sectional view obtained after a metal casing is assembled to the body in FIG. 2.
Figure 4:
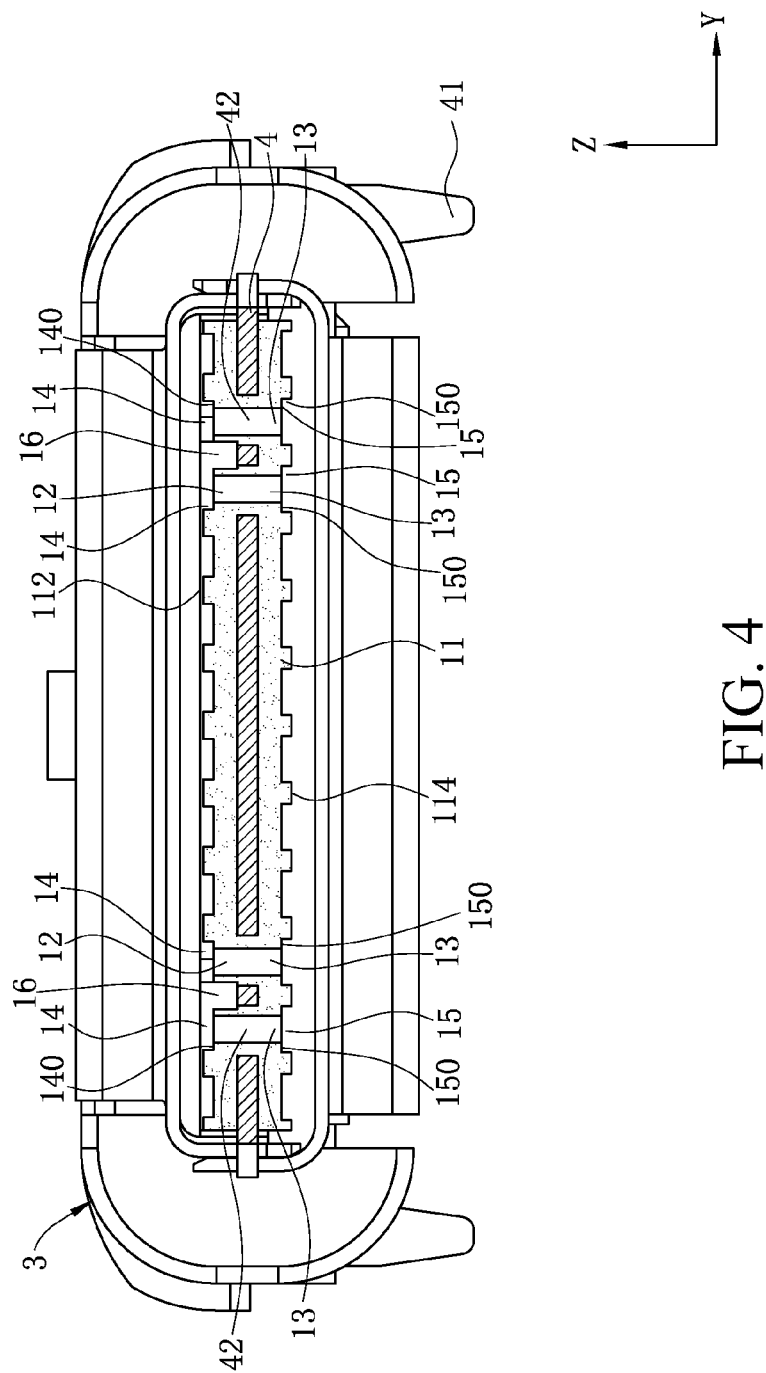
FIG. 4 is a sectional view obtained after terminals are hidden in FIG. 3.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

The description will be made as to the embodiments of the present invention in conjunction with the accompanying drawings in FIGS. 1-6. In accordance with the purposes of this invention, as embodied and broadly described herein, this invention, in one aspect, relates to an electrical connector.

As shown in FIG. 1, an electrical connector according to one embodiment of the present invention includes a body 1, multiple terminals 2 fixedly disposed in the body 1, and a metal casing 3 covering the body 1.

Referring to FIG. 1 to FIG. 4, the body 1 is made of a plastic material, includes a base 10 and a tongue 11 extending forward from the base 10. The thickness of the base 10 in a direction from top to bottom is greater than the thickness of the tongue 11. The entire tongue 11 is rectangular along a direction from front to rear, and the tongue 11 has an upper surface 112 and a lower surface 114 opposite to each other. The tongue 11 further has a direction from left to right perpendicular to the direction from front to rear and the direction from top to bottom. For convenience of understanding, as shown in a three-dimensional coordinate system in FIG. 1, an X axis denotes a forward direction, a Y axis denotes a rightward direction, and a Z axis denotes an upward direction.

Multiple first receiving slots 14 are depressed from the upper surface 112 downwardly. Multiple second receiving slots 15 are further depressed from the lower surface 114 upwardly. The first receiving slot 14 and the second receiving slot 15 are used for accommodating a part of the terminal 2. The first receiving slot 14 has a bottom wall 140, the second receiving slot 15 has a top wall 150, and the depth of the first receiving slot 14 and the second receiving slot 15 is roughly consistent with the thickness of the terminal 2, and may be entered by the terminals 2, so that the terminals 2 are accommodated in the first receiving slots 14 and the second receiving slots 15, and meanwhile a part of each of the terminals 2 is exposed from the upper surface 112 and the lower surface 114 of the tongue 11. Four of the first receiving slots 14 and four of the second receiving slots 15 are used for accommodating high-speed differential signal terminals, and the four first receiving slots 14 and the four second receiving slots 15 are disposed at left and right sides of the tongue 11 pairwise.

A first groove 12 is further depressed from each of the foregoing four first receiving slots 14 downwardly and is in communication with the first receiving slot 14, and the first groove 12 is filled with air. The four first grooves 12 are disposed on the upper surface 112 of the tongue 11 in two pairs, and the two pairs of first grooves 12 are separated by a distance. Correspondingly, a second groove 13 is further depressed from each of the foregoing four second receiving slots 15 upwardly and is in communication with the second receiving slot 15, and the second groove 13 is likewise filled with air. The four second grooves 13 are disposed on the lower surface 114 of the tongue 11 in two pairs, and the two pairs of second grooves 13 are separated by a distance. The first groove 12 and the second groove 13 are corresponding in upper and lower locations, and extend along the direction from front to rear to be lengthwise rectangular. This embodiment serves as a preferable implementation manner, and to reduce the plastic amount at the location as much as possible, the first groove 12 is in communication with the second groove 13 downwardly, thereby forming a through slot running through the upper and lower surfaces 112 and 114 of the tongue 11.

The depth of the four first receiving slots 14 and the four second receiving slots 15 in the direction from top to bottom is far less than the depth of the first groove 12 and the second groove 13. Meanwhile, the width of the foregoing four first receiving slots 14 in the direction from left rightward is greater than the width of the first groove 12, and the width of the second receiving slot 15 in the direction from left rightward is greater than the width of the second groove 13, thereby forming a step between the bottom wall 140 of the first receiving slot 14 and the side wall of the first groove 12, and also forming a step between the top wall 150 of the second receiving slot 15 and the side wall of the second groove 13.

The multiple terminals 2 are divided into upper and lower rows 2A and 2B which are respectively fixedly disposed in the body 1. Each row of the terminals 2 includes high-speed terminals and non-high-speed terminals, where the high-speed terminals are differential signal terminals for transmitting a USB 3.0 signal. The upper row of the terminals 2A includes a pair of first differential signal terminals 21, and each of the first differential signal terminals 21 has a first contact portion 210 fixed to and exposed from the upper surface 112 of the tongue 11. The first contact portion 210 is partially accommodated in the first receiving slot 14, is correspondingly located above one of the first grooves 12, extends in a flat plate shape along the direction from front to rear, and therefore may cover the top opening of the entire first groove 12, so that the bottom surface of the first contact portion 210 is at least partially exposed to the air in the first groove 12. Correspondingly, the lower row of terminals 2B includes a pair of second differential signal terminals 22, and each of the second differential signal terminals 22 has a second contact portion 220 fixed to and exposed from the lower surface 114 of the tongue 11. The second contact portion 220 is partially accommodated in the second receiving slot 15, is correspondingly located below one of the second grooves 13, extends in a flat plate shape along the direction from front to rear, and therefore may cover the bottom opening of the entire second groove 13, so that the top surface of the second contact portion 220 is at least partially exposed to the air in the second groove 13. In this embodiment, the upper row of terminals 2A is insert-molded in the body 1, while the lower row of terminals 2B is assembled to the lower surface 114 of the tongue 11 upward from the bottom of the body 1. The two pairs of first grooves 12 corresponding to the upper surface 112 of the tongue 11 are disposed with two pairs of first differential signal terminals 21, and non-high-speed terminals are at two sides of each pair of first differential signal terminals 21. The two pairs of second grooves 13 corresponding to the lower surface 114 of the tongue 11 are disposed with two pairs of second differential signal terminals 22, and non-high-speed terminals are also at two sides of each pair of second differential signal terminals 22. More specifically, each row of terminals 2A or 2B is sequentially provided from left to right with: a grounding terminal, a pair of USB 3.0 terminals, a power supply terminal, a reserved terminal, a pair of USB 2.0 terminals (that is the pair of third signal terminals), a reserved terminal, a power supply terminal, a pair of USB 3.0 terminals, and a grounding terminal.

The first contact portion 210 is partially accommodated in the first receiving slot 14, the bottom surface of the first contact portion 210 is supported by the bottom wall 140 of the first receiving slot 14, and the top surface of the first contact portion 210 is exposed from the upper surface 112 of the tongue 11. The first contact portion 210 has a first contact location used for contacting a mating element (such as a terminal of a mating connector), and the first receiving slot 14 is located right below the first contact location. The second contact portion 220 is partially accommodated in the second receiving slot 15, the top surface of the second contact portion 220 is supported by the top wall 150 of the second receiving slot 15, and the bottom surface of the second contact portion 220 is exposed from the lower surface 114 of the tongue 11. The second contact portion 220 has a second contact location used for contacting a mating element, and the second receiving slot 15 is located right above the second contact location. Both the first contact portion 210 and the second contact portion 220 according to certain embodiments of the present invention are in a flat plate shape, and contact an elastic contact portion bent in an arc shape on a mating terminal (not shown). When the elastic contact portion of the mating terminal is pressed against the first contact portion 210 and the second contact portion 220 in the flat plate shape, the bottom wall 140 of the first receiving slot 14 and the top wall 150 of the second receiving slot 15 may play a role of supporting the first contact portion 210 and the second contact portion 220 respectively, so as to prevent the first contact portion 210 and the second contact portion 220 from being depressed toward the center of the tongue 11, thereby avoiding that the first contact portion 210 and the second contact portion 220 are disconnected from the mating terminal.

A middle shielding sheet 4 located between the upper and lower rows of terminals 2A and 2B is further insert-molded in the body 1 of certain embodiments of the present invention. The middle shielding sheet 4 is made of a metal material, and includes a main body portion 40 which is rectangular along the direction from front to rear, and two welding feet 41 bent downward and extending from a rear end of the main body portion 40 separately. The welding foot 41 is used for conducting a grounding path in a circuit board (not shown). The main body portion 40 of the middle shielding sheet 4 is located between the first differential signal terminals 21 and the second differential signal terminals 22, and is used for shielding an interference signal between the first differential signal terminals 21 and the second differential signal terminals 22, so as to alleviate crosstalk of a high frequency signal in the transmission process. In this embodiment, the middle shielding sheet 4 and the upper row of terminals 2A are jointly insert-molded in the tongue 11, while the lower row of terminals 2B is assembled to the lower surface 114 of the tongue 11 upward from the bottom of the body 1. To provide convenience for a die to position the upper row of terminals 2A in the insert-mold process, a location on the main body portion 40 of the middle shielding sheet 4 corresponding to the first groove 12 and the second groove 13 is provided with a hollow portion 42, and the hollow portion 42 enables the first groove 12 and the second groove 13 to be in communication with each other, and also provides convenience for a positioning pin of the die to be inserted from the lower surface 114 of the tongue 11 to press against the bottom surface of the first differential signal terminals 21 to position the first differential signal terminals 21, so that subsequently plastic is injected into a cavity of the die to form the body 1. The length of the hollow portion 42 in the direction from front to rear and the width thereof in the direction from left to right are slightly greater than those of the first groove 12 and the second groove 13, and are also slightly greater than those of the first contact portion 210 and the second contact portion 220.

To further increase the exposure area of each differential signal terminal in air, a depressed slot 16 is further depressed from the upper surface 112 of the tongue 11 between two first differential signal terminals 21, and the depressed slot 16 is in communication with two adjacent first receiving slots 14, so that side surfaces directly facing each other of the two first differential signal terminals 21 are exposed to air as much as possible. Multiple positioning slots 17 are further depressed from the upper surface 112, the positioning slots 17 are located between two adjacent non-high-speed terminals and between a non-high-speed terminal and a first differential signal terminal 21 adjacent to each other, and the positioning slots 17 are also in communication with the two adjacent first receiving slots 14. In the process of insert-molding the upper row of terminals 2A, the positioning pin of the die may be inserted into left and right sides (that is, locations of the positioning slots 17) of each terminal 2 from the upper surface 112 of the tongue 11, thereby limiting each terminal 2 in the horizontal direction, so as to prevent the terminals 2 from being deformed or warped due to a high temperature when a fused plastic material is injected. The length of at least one positioning slot 17 along the direction from front to rear is less than the length of the depressed slot 16 along the direction from front to rear. To make the differential signal terminals be exposed to air as much as possible, the depressed slot 16 is set to be long, and meanwhile, in order to prevent interference between non-high-speed terminals, and interference between a non-high-speed terminal and a first differential signal terminal 21, the positioning slot 17 is set to be short as much as possible, so that in this embodiment, the length of all of the positioning slots 17 is less than the length of the depressed slot 16.

Moreover, an upper shielding sheet 5 and a lower shielding sheet 6 are separately disposed on the body 1. The upper and lower shielding sheets 5 and 6 are buckled and connected at a side of the tongue 11 by using a buckling structure. The upper and lower shielding sheets 5 and 6 respectively have urging portions 50 and 60 fixed to surfaces of the base 10 of the body 1. Fixing portions 51 and 61 covering the upper and lower surfaces 112 and 114 of the tongue 11 separately extend forward from the urging portions 50 and 60. Moreover, the urging portions 50 and 60 of the upper and lower shielding sheets 5 and 6 separately contact the metal casing 3, and are used for implementing grounding conduction. The metal casing 3 includes an inner shell 30 and an outer shell 31 covering the inner shell 30. The inner shell 30 is cylindrical and covers the entire body 1, and a front end opening thereof is used for the mating element to be inserted. The outer shell 31 may be fixed to the inner shell 30 in a spot welding or another manner, and DIP-type welding feet extend downward from two sides of the outer shell 31, and are used for electrically conducting the grounding path on the circuit board.

The molding manner of the electrical connector according to certain embodiments of the present invention is roughly as follows.

First, multiple terminals 2 are divided into an upper row and a lower row, which are each insert-molded at an insulation block 7, so that these terminals 2 and the insulation blocks 7 form an upper terminal module and a lower terminal module. Secondly, the upper terminal module and a middle shielding sheet 4 are jointly insert-molded in a body 1, so that the terminals 2 in the upper terminal module are exposed from an upper surface 112 of a tongue 11, and the middle shielding sheet 4 is fixedly disposed in the middle of the tongue 11. Then, the lower terminal module is assembled to a lower surface 114 of the tongue 11 upward. After that, upper and lower shielding sheets 5 and 6 are respectively fixed to the upper and lower surfaces of the body 1, and are buckled to each other. Finally, a metal casing 3 sleeves the body 1, so that an inner shell 30 separately contacts the upper and lower shielding sheets 5 and 6.

In other embodiments, both the upper row of terminals 2A and the lower row of terminals 2B may also be fixed to the tongue 11 in an assembly manner, the middle shielding sheet 4 may not be provided with any hollow portion 42, and the first groove 12 may not be in communication with the second groove 13.

Figure 5:
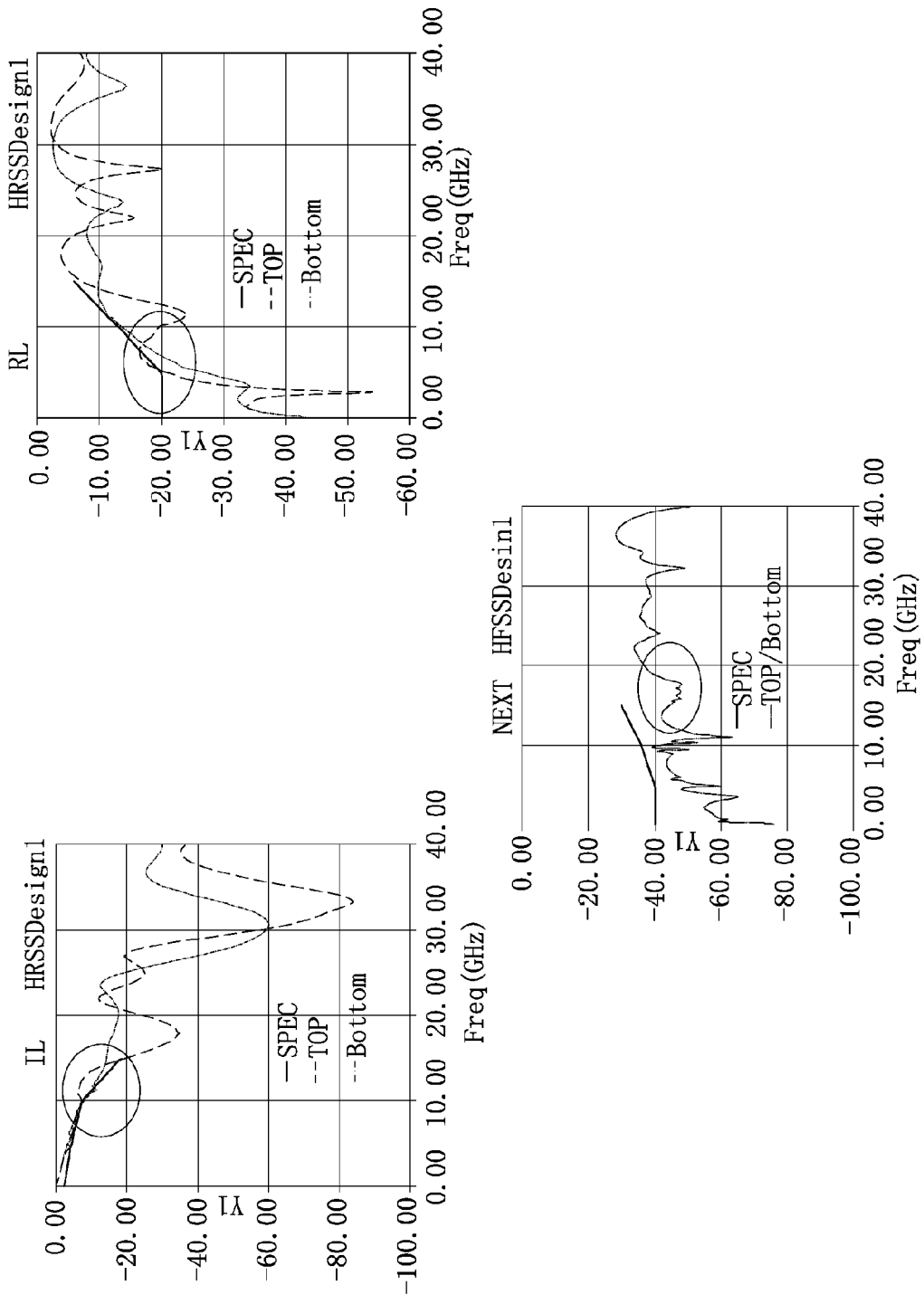
FIG. 5 is an S-parameter curve graph of a first connector model, where locations of differential signal terminals corresponding to a tongue of the model are not dug to form a first groove and a second groove, and a middle shielding sheet is not correspondingly provided with a hollow portion.
Figure 6:
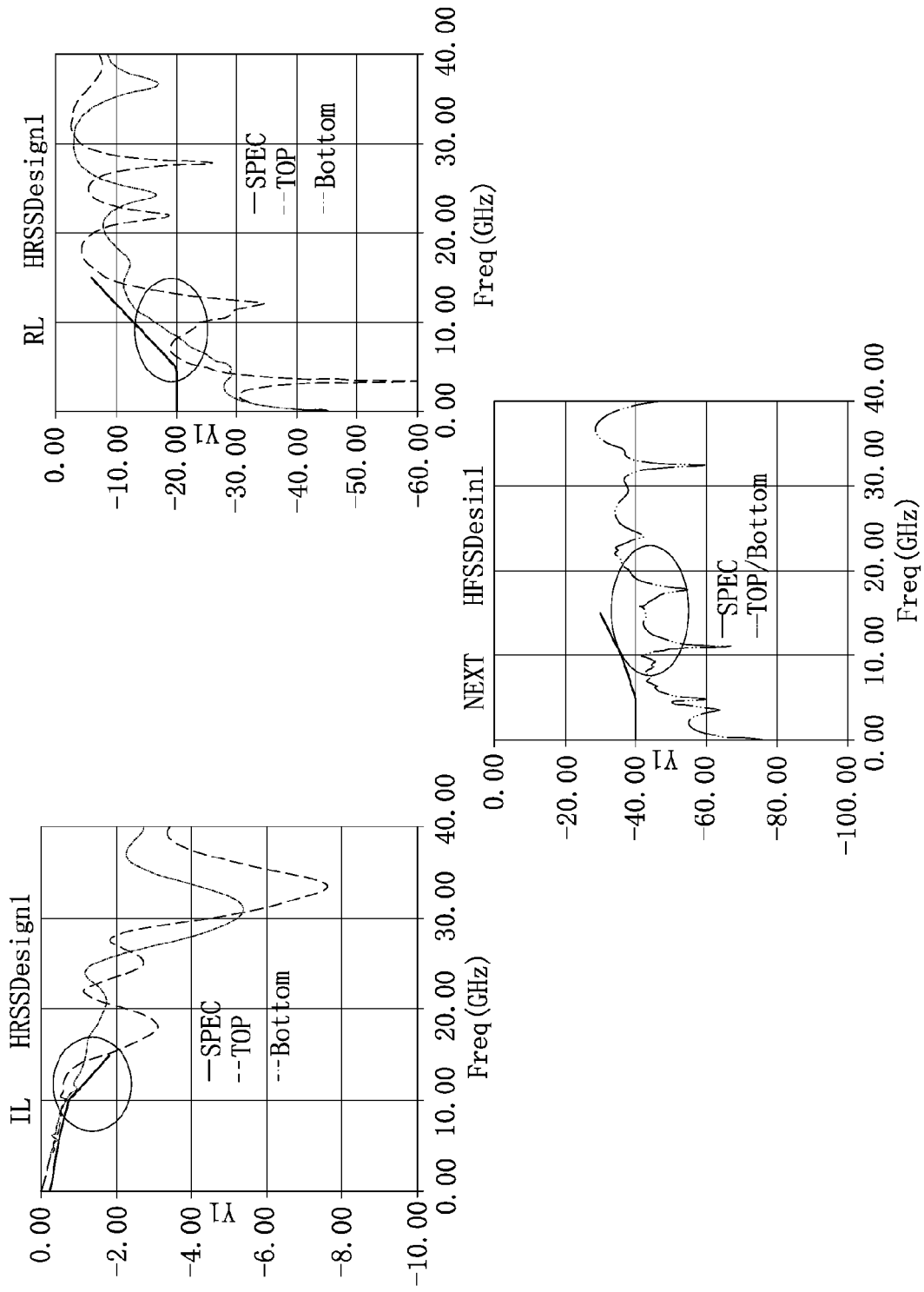
FIG. 6 is an S-parameter curve graph of a second connector model, where locations of differential signal terminals corresponding to a tongue of the model are dug to form a first groove and a second groove, and a middle shielding sheet is not correspondingly provided with a hollow portion.
Figure 7:
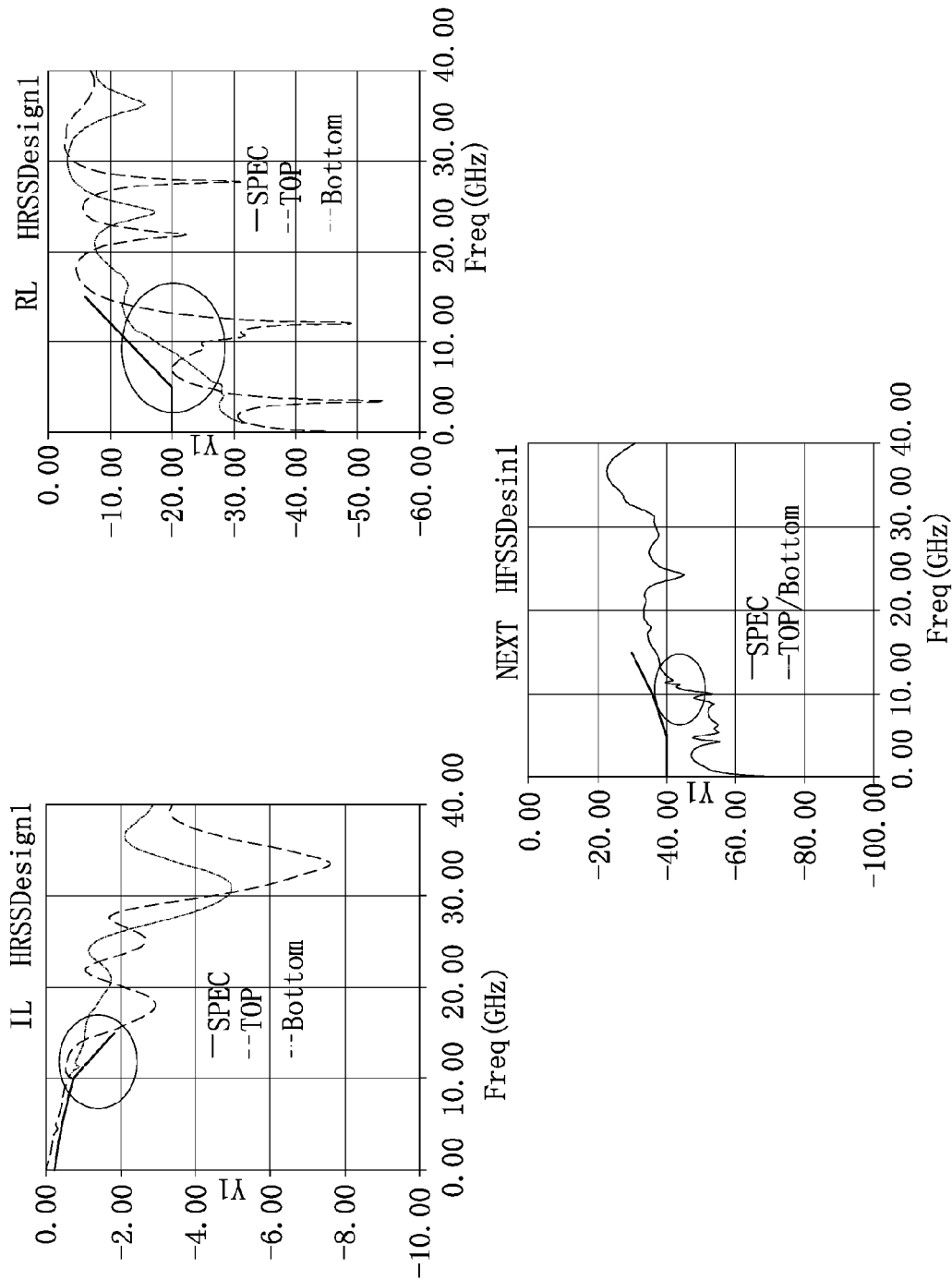
FIG. 7 is an S-parameter curve graph of a connector model according to the present invention.

For convenience of understanding, the inventor of the present invention separately performs high frequency performance analysis on three models of whether locations of the tongue 11 corresponding to differential signal terminals are dug to form grooves, and whether a location corresponding to the middle shielding sheet 4 is provided with a hollow portion 42, and specific S-parameters thereof are shown in FIG. 5 to FIG. 7.

Theoretically, if the insertion loss (IL) is above the specification line (SPEC) (closer to 0), it indicates that the effect is better, and if the return loss (RL) and the crosstalk (NEXT) are below the specification line (SPEC) (farther away from 0), it indicates that the effect is better.

1. In the first model, locations of the tongue 11 corresponding to differential signal terminals are not dug to form the first groove 12 and the second groove 13, the middle shielding sheet 4 is not correspondingly provided with any hollow portion 42, the S-parameter after the model analysis is shown in FIG. 5. The insertion loss (IL) of the first differential signal terminal 21 of the upper row of terminals 2A (TOP) and the insertion loss (IL) of the second differential signal terminal 22 of the lower row of terminals 2B (BOTTOM) are partially below the specification line (SPEC), that is, the IL thereof is far away from 0, while the return loss (RL) thereof is partially above the specification line (SPEC), the crosstalk (NEXT) deviates from the specification line (SPEC) to a great extent, and both the insertion loss (IL) and the return loss (RL) of the differential signal terminal pair thereof are bad.

2. In the second model, locations of the tongue 11 corresponding to differential signal terminals are dug to form the first groove 12 and the second groove 13, the middle shielding sheet 4 is not correspondingly provided with any hollow portion 42, the S-parameter after the model analysis is shown in FIG. 6. The insertion loss (IL) thereof is above the specification line (SPEC), the return loss (RL) and the crosstalk (NEXT) are below the specification line (SPEC), and the insertion loss (IL) and the return loss (RL) of the differential signal terminal pair in the model are good.

3. In the third model (that is, the embodiment shown in FIG. 1 to FIG. 3), locations of the tongue 11 corresponding to differential signal terminals are dug to form the first groove 12 and the second groove 13, the middle shielding sheet 4 is correspondingly provided with a hollow portion 42, and the first groove 12 and the second groove 13 are in communication with each other. The S-parameter after the model analysis is shown in FIG. 7. The insertion loss (IL) of the model is above the specification line (SPEC), the return loss (RL) and the crosstalk (NEXT) are below the specification line (SPEC), and the effect of the insertion loss (IL) and the return loss (RL) of the differential signal terminal pair in the model is good. This embodiment serves as a preferable implementation manner. To ensure the strength of the tongue 11 and that the terminals 2 are stably held and not damaged on the tongue 11, and meanwhile, to reduce production costs as much as possible, a molding manner in which the upper row of terminals 2A and the middle shielding sheet 4 are jointly insert-molded in the body 1, while the lower row of terminals 2B is assembled to the lower surface 114 of the tongue 11 upward from the bottom of the body 1 is selected, so that the hollow portion 42 needs to be disposed on the middle shielding sheet 4 to enable the first groove 12 and the second groove 13 to be in communication with each other, thereby providing convenience for the positioning pin of the die to be inserted from the lower surface 114 of the tongue 11 to press against the lower surface of the first differential signal terminal 21, and therefore subsequently plastic is injected into the cavity of the die to form the body 1.

Certain embodiments of the present invention, among other things, have the following beneficial advantages.

1. The first groove 12 is disposed below the tongue 11 corresponding to the first contact portion 210, and the second groove 13 is disposed above the tongue 11 corresponding to the second contact portion 220, so as to reduce plastic materials around the first differential signal terminal 21 and the second differential signal terminal 22, so that the first differential signal terminal 21 and the second differential signal terminal 22 are exposed to air as much as possible, thereby effectively reducing the insertion loss and the return loss of the high frequency signal during transmission in these terminals. Meanwhile, the middle shielding sheet 4 disposed in the middle of the tongue 11 facilitates alleviation of the problem of crosstalk between the upper and lower pairs of first and second differential signal terminals 21 and 22. The first groove 12 and the second groove 13 are respectively disposed at the first contact portion 210 and the second contact portion 220 corresponding to the first and second differential signal terminals 21 and 22, to enable contact areas of these terminals to be exposed to air as much as possible, and therefore the characteristic impedance of the contact areas of the terminals may be effectively controlled, so that the impedance of these differential signal terminals 21 and 22 can match the impedance of the mating connector or the terminals in the mating connector, thereby reducing the insertion loss and the return loss of the high frequency signal during transmission in the mating connector or the terminals of the mating connector.

2. The upper surface 112 and the lower surface 114 of the tongue 11 are respectively provided with the first receiving slot 14 and the second receiving slot 15 corresponding to the first differential signal terminal 21 and the second differential signal terminal 22, so when the elastic contact portion of the mating terminal is pressed against the first contact portion 210 and the second contact portion 220 in a flat plate shape, the bottom wall 140 of the first receiving slot 14 and the top wall 150 of the second receiving slot 15 may play a role of supporting the first contact portion 210 and the second contact portion 220 respectively, thereby preventing the first contact portion 210 and the second contact portion 220 from being depressed toward the center of the tongue 11, so as to avoid that the first contact portion 210 and the second contact portion 220 are disconnected from the mating terminal.

3. A molding manner in which both the middle shielding sheet 4 and the upper row of terminals 2A are insert-molded in the tongue 11, and the second differential signal terminal 22 is assembled to the lower surface 114 is most preferably used in certain embodiments of the present invention. Compared with a manner in which the upper and lower rows of terminals 2A and 2B are fixed to the tongue 11 in an assembly manner, this manner can ensure the strength of the tongue 11 (since the tongue 11 needs to be thinned or dug when the upper and lower terminal modules are assembled to the tongue 11). Compared with a manner in which the upper and lower rows of terminals 2A and 2B are fixed to the tongue 11 in an insert-mold manner, this manner may ensure that the terminals 2 are stably held and not damaged on the tongue 11 (since two sets of dies are required to position the upper and lower rows of terminals when the upper and lower terminal modules and the tongue 11 are combined in an insert-mold manner, and the dies easily crush terminals in the second molding process). Meanwhile production costs are reduced.

4. A depressed slot 16 is further depressed from the upper surface 112 between two first differential signal terminals 21, so that surfaces directly facing each other of the two first differential signal terminals 21 are exposed to air as much as possible, so as to more effectively alleviate the insertion loss and the return loss of each pair of first differential signal terminals 21.

5. In the process of insert-molding the upper row of terminals 2A, the positioning pin of the die may be inserted into left and right sides (that is, locations of the positioning slots 17) of each terminal 2 from the upper surface 112 of the tongue 11, thereby limiting each terminal 2 in the horizontal direction, so as to prevent the terminals 2 from being deformed or warped due to a high temperature when a fused plastic material is injected.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments are chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:
1. An electrical connector, comprising:
    a body having a tongue extending along a direction from front to rear, wherein the tongue comprises an upper surface and a lower surface opposite to each other, two first receiving slots are depressed from the upper surface, a first groove is downward depressed from the upper surface from each of the first receiving slots, two second receiving slots are depressed from the lower surface, and a second groove is upward depressed from the lower surface from each of the second receiving slots;
    a pair of first differential signal terminals fixed to the body, wherein each of the first differential signal terminals has a first contact portion fixed to and exposed from the upper surface of the tongue, and the first contact portion is partially accommodated in the first receiving slot;
    a pair of second differential signal terminals fixed to the body, wherein each of the second differential signal terminals has a second contact portion fixed to and exposed from the lower surface of the tongue, and the second contact portion is partially accommodated in the second receiving slot; and
    a middle shielding sheet, fixedly disposed at the tongue, and located between the first differential signal terminals and the second differential signal terminals.

2. The electrical connector according to claim 1, wherein the first receiving slot has a bottom wall supporting the first contact portion.

3. The electrical connector according to claim 2, wherein the first contact portion has a first contact location used for contacting a mating element, and the bottom wall is located right below the first contact location.

4. The electrical connector according to claim 1, wherein the second receiving slot has a top wall supporting the second contact portion.

5. The electrical connector according to claim 4, wherein the second contact portion has a second contact location used for contacting a mating element, and the top wall is located right above the second contact location.

6. The electrical connector according to claim 1, wherein the middle shielding sheet comprises a hollow portion corresponding to locations of the first groove and the second groove, and the first groove is in communication with the second groove.

7. The electrical connector according to claim 1, wherein both the middle shielding sheet and the first differential signal terminals are insert-molded in the tongue, and the second differential signal terminals are assembled to the lower surface.

8. The electrical connector according to claim 1, wherein the first contact portion is at least partially exposed to the first groove, and the second contact portion is at least partially exposed to the second groove.

9. The electrical connector according to claim 1, further comprising a depressed slot depressed from the upper surface and located between two first differential signal terminals, wherein the depressed slot is in communication with two adjacent first receiving slots.

10. The electrical connector according to claim 9, wherein multiple non-high-speed terminals are further insert-molded in the upper surface of the tongue, the non-high-speed terminals and the pair of first differential signal terminals are arranged into a row, multiple first receiving slots correspondingly accommodating the non-high-speed terminals are additionally depressed from the upper surface, multiple positioning slots are further depressed from the upper surface, the positioning slots are located between two adjacent non-high-speed terminals and between a non-high-speed terminal and a first differential signal terminal adjacent to each other, and the positioning slots are in communication with two adjacent first receiving slots.

11. The electrical connector according to claim 10, wherein the length of at least one positioning slot along the direction from front to rear is less than the length of the depressed slot along the direction from front to rear.

12. The electrical connector according to claim 1, wherein the tongue has a direction from left to right perpendicular to the direction from front to rear and a direction from top to bottom, the width of the first receiving slot in the direction from left to right is greater than the width of the first groove, and the width of the second receiving slot in the direction from left to right is greater than the width of the second groove.

13. An electrical connector, comprising:
a body having a tongue extending along a direction from front to rear, wherein the tongue comprises an upper surface and a lower surface opposite to each other, four first receiving slots are depressed from the upper surface, a first groove is downward depressed from the upper surface from each of the first receiving slots, four second receiving slots are depressed from the lower surface, and a second groove is further upward depressed from the lower surface from each of the second receiving slots;
two pairs of first differential signal terminals fixed to the body, wherein each of the first differential signal terminals has a first contact portion fixed to and exposed from the upper surface of the tongue, and the first contact portion is partially accommodated in the first receiving slot;
two pairs of second differential signal terminals fixed to the body, wherein each of the second differential signal terminals has a second contact portion fixed to and exposed from the lower surface of the tongue, and the second contact portion is partially accommodated in the second receiving slot; and
two pair of third signal terminals each respectively disposed between each of the two pairs of first differential signal terminals and each of the two pairs of second differential signal terminals, the third signal terminals are non-high-speed terminals, and a grounding terminal is disposed at an outer side of each of the two pairs of first differential signal terminals and the two pairs of second differential signal terminals away from the third signal terminals.

14. The electrical connector according to claim 13, further comprising a middle shielding sheet fixedly disposed at the tongue, and located between the first differential signal terminals and the second differential signal terminals.

15. The electrical connector according to claim 14, wherein the middle shielding sheet comprises a hollow portion corresponding to locations of the first groove and the second groove, and the first groove is in communication with the second groove.

16. The electrical connector according to claim 14, wherein both the middle shielding sheet and the first differential signal terminals are insert-molded in the tongue, and the second differential signal terminals are assembled to the lower surface.

17. The electrical connector according to claim 14, wherein the middle shielding sheet protrudes from a front edge and left and right side edges of the tongue.

18. The electrical connector according to claim 13, further comprising multiple power supply terminals and multiple reserved terminals, wherein all of the foregoing terminals are arranged into two rows respectively located on the upper surface and the lower surface, and each row of terminals is sequentially provided in a direction from left to right with: one of the grounding terminals, one of the pairs of first differential signal terminals, one of the power supply terminals, one of the reserved terminals, one of the pairs of third signal terminals, one of the reserved terminals, one of the power supply terminals, one of the pairs of first differential signal terminals, and one of the grounding terminals.

19. The electrical connector according to claim 18, wherein the row of terminals located on the upper surface and the row of terminals located on the lower surface are centrosymmetrically arranged.

20. The electrical connector according to claim 13, further comprising an upper shielding sheet and a lower shielding sheet respectively disposed above and below the tongue, and buckled and connected to each other.

21. An electrical connector, comprising:
a body having at least two grooves disposed therein, wherein the grooves are filled with air;
at least one pair of differential signal terminals fixed to the body, wherein each of the at least one pair of differential signal terminals has a contact portion used for electrically connecting to a mating element, each of the contact portions is correspondingly located above one of the grooves, and the contact portion is in communication with the groove and exposed to the air in the groove;
a metal casing covering the body; and
a middle shielding sheet fixedly disposed at the body, and located below the differential signal terminals, wherein the middle shielding sheet comprises a hollow portion at locations corresponding to the grooves.

22. An electrical connector, comprising:
a body having at least two grooves disposed therein, wherein the grooves are filled with air;
at least one pair of differential signal terminals fixed to the body, wherein each of the at least one pair of differential signal terminals has a contact portion used for electrically connecting to a mating element, each of the contact portions is correspondingly located above one of the grooves, and the contact portion is in communication with the groove and exposed to the air in the groove;

a metal casing covering the body; and an upper shielding sheet and a lower shielding sheet respectively disposed above and below the body, and buckled and connected to each other, wherein the upper shielding sheet and the lower shielding sheet respectively contact the metal casing.

* * * * *